United States Patent
Brady et al.

(10) Patent No.: US 10,458,319 B2
(45) Date of Patent: Oct. 29, 2019

(54) WASTEGATE ASSEMBLY, A TURBOCHARGER THAT UTILIZES THE WASTEGATE ASSEMBLY AND A METHOD

(71) Applicant: GM GLOBAL TECHNOLOGY OPERATIONS LLC, Detroit, MI (US)

(72) Inventors: Grant W. Brady, Howell, MI (US); Huaxin Li, Rochester Hills, MI (US); Julie A. Swartz, Commerce Township, MI (US); Jane E. Preston, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 15/611,180

(22) Filed: Jun. 1, 2017

(65) Prior Publication Data

US 2018/0347452 A1    Dec. 6, 2018

(51) Int. Cl.
*F02B 37/18* (2006.01)
*F02B 39/08* (2006.01)
*B23K 26/22* (2006.01)

(52) U.S. Cl.
CPC ............ *F02B 37/186* (2013.01); *B23K 26/22* (2013.01); *F02B 39/08* (2013.01)

(58) Field of Classification Search
CPC ............. F02B 37/18–186; B23K 26/22; F01D 17/105; F01D 17/141; F01D 17/145
See application file for complete search history.

*Primary Examiner* — Ngoc T Nguyen
(74) *Attorney, Agent, or Firm* — Quinn IP Law

(57) ABSTRACT

A method of joining parts of the wastegate assembly, and a wastegate assembly includes an arm defining a hole. The wastegate assembly also includes a shaft. The shaft includes a first end disposed inside the hole of the arm. The shaft includes an outer surface defining a groove disposed inside the hole of the arm. The arm and the first end of the shaft are welded together to form a joint having a joint root region disposed adjacent to the groove.

A turbocharger includes a compressor, a turbine and a rotating assembly driven by exhaust gas. The rotating assembly has a turbine wheel disposed inside the turbine and a compressor wheel disposed inside the compressor. The turbocharger further includes the wastegate assembly described above, and the wastegate assembly defines an opening configured to selectively redirect at least a portion of the exhaust gas to bypass the turbine wheel.

19 Claims, 3 Drawing Sheets

WASTEGATE ASSEMBLY, A TURBOCHARGER THAT UTILIZES THE WASTEGATE ASSEMBLY AND A METHOD

INTRODUCTION

Internal combustion engines (ICE) are often called upon to generate considerable levels of power for prolonged periods of time on a dependable basis. Many such ICE assemblies employ an inlet air charging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Frequently, such turbochargers are driven by the engine's exhaust gas.

A typical exhaust gas driven turbocharger includes a central shaft that is supported by one or more bearings and that transmits rotational motion between a turbine wheel and an air compressor wheel. Both the turbine and compressor wheels are fixed to the shaft, which in combination with various bearing components constitute the turbocharger's rotating assembly. Turbochargers frequently employ wastegate valves to limit operational speeds of the rotating assembly in order to maintain turbocharger boost within prescribed limits and prevent rotating assembly over speed.

SUMMARY

The present disclosure provides a wastegate assembly including an arm defining a hole. The wastegate assembly also includes a shaft. The shaft includes a first end disposed inside the hole of the arm. The shaft includes an outer surface defining a groove disposed inside the hole of the arm. The arm and the first end of the shaft are welded together to form a joint having a joint root region disposed adjacent to the groove.

The present disclosure also provides a turbocharger including a compressor, a turbine and a rotating assembly driven by exhaust gas. The rotating assembly has a turbine wheel disposed inside the turbine and a compressor wheel disposed inside the compressor. The turbocharger further includes a wastegate assembly defining an opening configured to selectively redirect at least a portion of the exhaust gas to bypass the turbine wheel. The wastegate assembly includes an arm defining a hole. The wastegate assembly also includes a shaft. The shaft includes a first end disposed inside the hole of the arm. The shaft includes an outer surface defining a groove disposed inside the hole of the arm. The arm and the first end of the shaft are welded together to form a joint having a joint root region disposed adjacent to the groove.

The present disclosure also provides a method of joining parts of a wastegate assembly. The method includes positioning a first end of a shaft inside a hole of an arm. An outer surface of the shaft defines a groove disposed inside the hole of the arm. The method also includes positioning a laser welder relative to the first end of the shaft and the arm. The method further includes welding the first end of the shaft and the arm together with the laser welder until a joint forms a joint root region having an arcuate surface adjacent to the groove in the shaft.

The detailed description and the drawings or figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
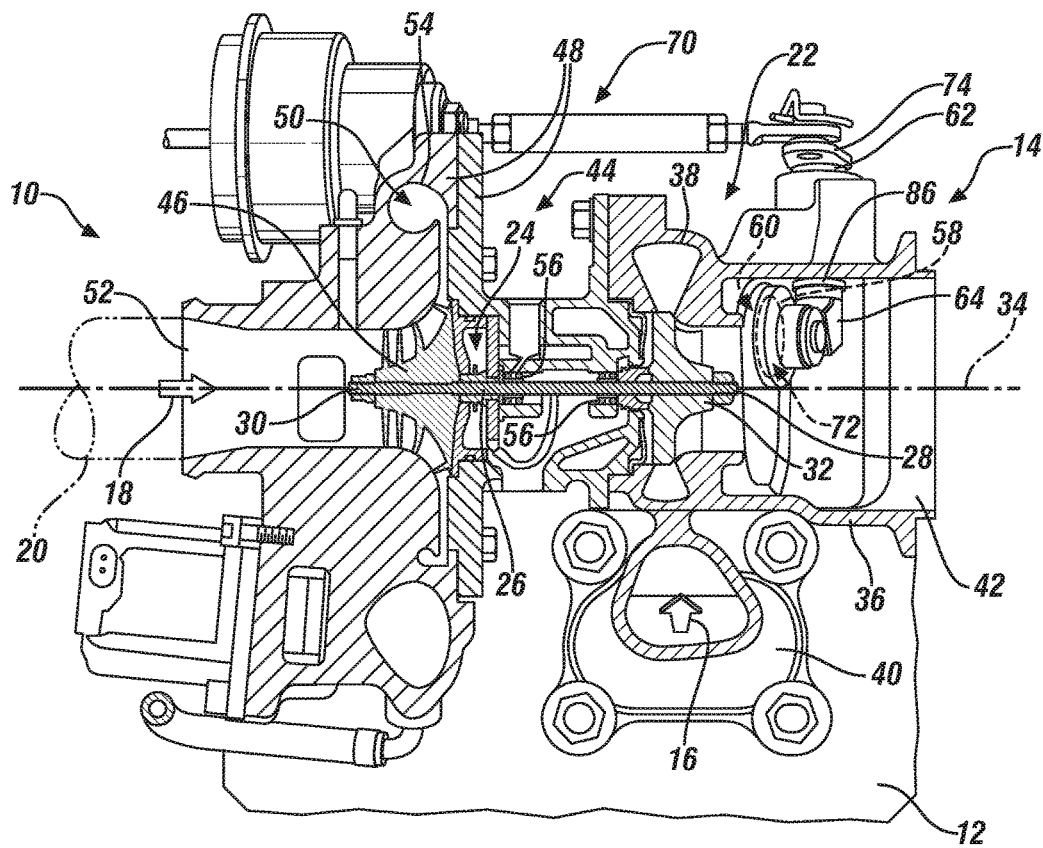
FIG. 1 is a schematic cross-sectional view of the turbocharger illustrating a wastegate assembly.

Referring to the figures, wherein like numerals indicate like or corresponding parts throughout the several views, a turbocharger 10 supported by an engine 12 is generally shown in FIG. 1, and a wastegate assembly 14 is also shown in FIG. 1.

The engine 12 may be an internal combustion engine. The engine 12 may also include a cylinder block with a plurality of cylinders arranged therein. The engine 12 may further include a cylinder head that is mounted on the cylinder block. Each cylinder may include a piston configured to reciprocate therein.

Combustion chambers are formed within the cylinders between a bottom surface of the cylinder head and a top of the pistons. Generally, each of the combustion chambers receives fuel and air from the cylinder head that form a fuel-air mixture for subsequent combustion inside the subject combustion chamber. The fuel is supplied to each of the cylinders via a respective fuel injector. The cylinder head is also configured to exhaust post-combustion gas from the combustion chambers.

The engine 12 may also include a crankshaft configured to rotate within the cylinder block. The crankshaft is rotated by the pistons as a result of an appropriately proportioned fuel-air mixture being burned in the combustion chambers. After the air-fuel mixture is burned inside a specific combustion chamber, the reciprocating motion of a particular piston serves to expel post-combustion exhaust gas 16 (see arrow 16 in FIG. 1) from the respective cylinder following the combustion.

The engine 12 additionally may include an induction system configured to channel an airflow 18 (see arrow 18 in FIG. 1) from the ambient to the cylinders. The induction system may include an intake air duct 20, the turbocharger 10, and an intake manifold. The induction system may additionally include an air filter upstream of the turbocharger 10 for removing foreign particles and other airborne debris from the airflow 18.

The turbocharger 10 is in fluid communication with the cylinders. Specifically, the intake air duct 20 is configured to channel the airflow 18 from the ambient to the turbocharger 10, while the turbocharger 10 is configured to pressurize the received airflow 18, and discharge the pressurized airflow 18 to the intake manifold. The intake manifold in turn distributes the previously pressurized airflow 18 to the cylinders for mixing with an appropriate amount of fuel and subsequent combustion of the resultant fuel-air mixture.

As shown in FIG. 1, the turbocharger 10 may include a turbine 22, and furthermore, may include a rotating assembly 24 driven by exhaust gas 16. The rotating assembly 24 may include a shaft 26 having a first distal end 28 and a second distal end 30. The rotating assembly 24 may also include a turbine wheel 32 disposed inside the turbine 22. The turbine wheel 32 is mounted on the shaft 26 proximate to the first distal end 28 and configured to be driven, i.e., rotated along with the shaft 26 about an axis 34, by the exhaust gas 16 emitted from the cylinders. The turbine wheel 32 is disposed inside a turbine housing 36 that includes a turbine volute or scroll 38. Hence, the turbine 22 is generally identified as including the turbine wheel 32, the turbine housing 36 and the turbine volute or scroll 38.

Continuing with FIG. 1, the turbine scroll 38 receives the post-combustion exhaust gas 16 at a turbine inlet 40 and directs the exhaust gas 16 to the turbine wheel 32. After the turbine wheel 32, the exhaust gas 16 is directed through a turbine outlet 42 into an exhaust system. The turbine scroll 38 is configured to achieve specific performance characteristics, such as efficiency and response, of the turbocharger 10.

As further shown in FIG. 1, the turbocharger 10 may include a compressor 44, and the rotating assembly 24 may also include a compressor wheel 46 disposed inside the compressor 44. The compressor wheel 46 is mounted on the shaft 26 between the first and second distal ends 28, 30. The compressor wheel 46 is configured to pressurize the airflow 18 being received from the ambient for eventual delivery to the cylinders. The compressor wheel 46 is disposed inside a compressor housing 48 or cover that includes a compressor volute or scroll 50. Hence, the compressor 44 is generally identified as including the compressor wheel 46, the compressor housing 48 and the compressor volute or scroll 50.

Continuing with FIG. 1, the compressor scroll 50 receives the airflow 18 at a compressor inlet 52 and directs the airflow 18 to the compressor wheel 46 for pressurization. After the compressor wheel 46, the pressurized airflow 18 is directed through a compressor outlet 54 toward the cylinders. The compressor scroll 50 is configured to achieve specific performance characteristics, such as peak airflow 18 and efficiency of the turbocharger 10. Accordingly, rotation is imparted to the shaft 26 by the exhaust gas 16 energizing the turbine wheel 32, and is in turn communicated to the compressor wheel 46 due to the compressor wheel 46 being fixed on the shaft 26.

The rotating assembly 24 is supported for rotation about the axis 34 via journal bearings 56 (see FIG. 1). During operation of the turbocharger 10, the rotating assembly 24 may frequently operate at speeds over revolutions per minute (RPM) while generating boost pressure for engine 12, i.e., pressurizing the airflow 18 for delivery to the cylinders. Furthermore, the variable flow and force of the exhaust gas 16 influences the amount of boost pressure that may be generated by the compressor wheel 46 throughout the operating range of the engine 12.

With continued reference to FIG. 1, in certain embodiments, the turbocharger 10 may include the wastegate assembly 14 defining an opening 58 configured to selectively redirect at least a portion of the exhaust gas 16 to bypass the turbine wheel 32. The wastegate assembly 14 may either be internal, built-in to the turbocharger 10, or external to the turbocharger 10 arrangement. The wastegate assembly 14 may define a passage 60 that presents the opening 58 configured to selectively redirect at least a portion of the exhaust gas 16 from the turbine inlet 40 to the turbine outlet 42 to bypass the turbine wheel 32. Permitting some of the exhaust gas 16 to bypass the turbine wheel 32 serves to limit rotational speed of the rotating assembly 24 and pressure of the airflow 18 received from the ambient.

Referring to FIG. 1, the wastegate assembly 14 includes a shaft 62, and may include a valve 64 fixed to the shaft 62. The shaft 62 is movable relative to a pivot axis 66 (see FIG. 2), which causes the valve 64 to move between an open position and a closed position. In certain embodiments, the shaft 62 is rotatable about the pivot axis 66. Optionally, a bushing 68 may be disposed around the shaft 62.

Furthermore, the wastegate assembly 14 may include an actuator 70 to rotate the shaft 62 between the open and closed positions, thereby shifting the valve 64 relative to the passage 60 and changing an effective area 72 of the opening 58, i.e., an area of the actual or operative opening 58 through which the exhaust gas 16 may bypass the turbine wheel 32.

Figure 2:
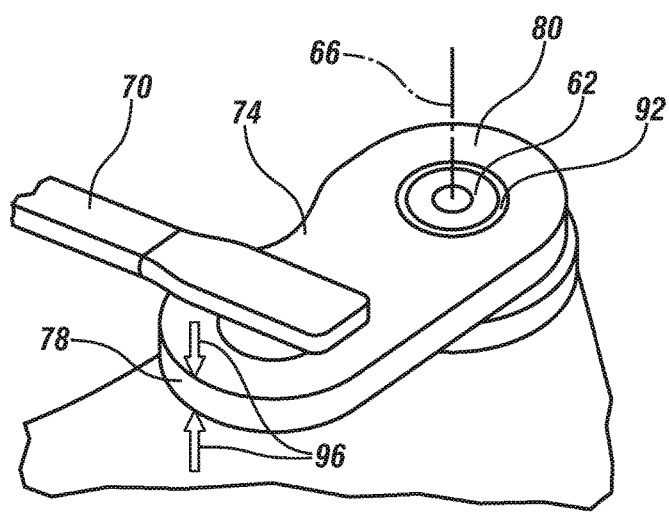
FIG. 2 is a schematic fragmented perspective view of part of the wastegate assembly including an arm fixed to a shaft via a joint.
Figure 3:
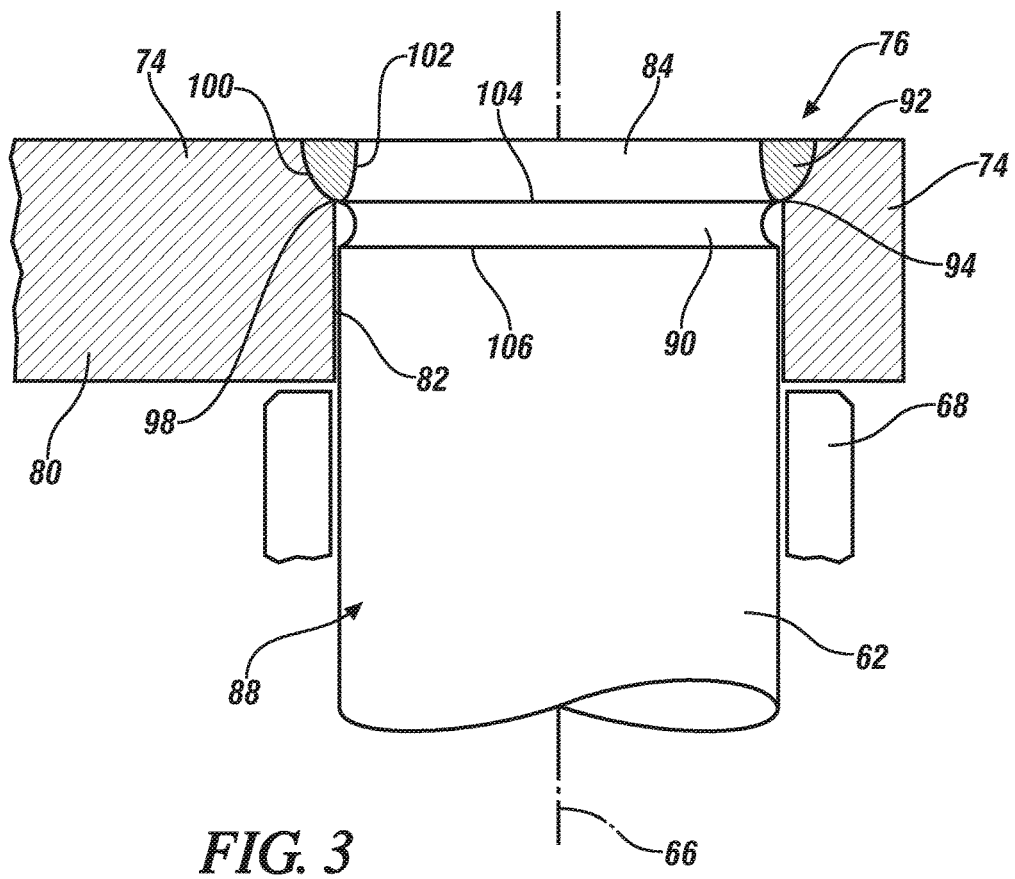
FIG. 3 is a schematic partial cross-sectional view of part of the wastegate assembly.
Figure 4:
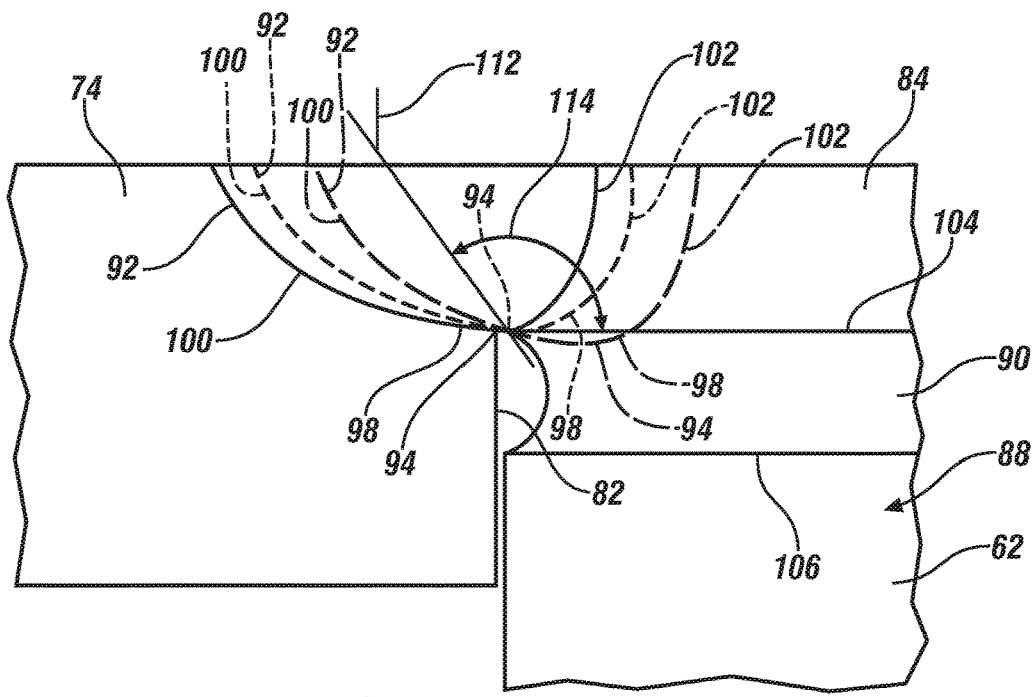
FIG. 4 is a schematic illustration of a position of a welder and three examples of joints created by the welder.

Referring to FIGS. 2-4, the wastegate assembly 14 includes an arm 74 defining a hole 76. The arm 74 is movable relative to the pivot axis 66. The arm 74 may include a first end region 78 and a second end region 80 spaced from each other. Part of the actuator 70 may be attached to the first end region 78 to direct movement of the arm 74. In certain embodiments, the arm 74 is rotatable about the pivot axis 66. The shaft 62 is fixed to the arm 74, which is discussed further below, and thus, movement of the arm 74 causes the shaft 62 to move accordingly.

Generally, the arm 74 may include an inner surface 82 defining a periphery of the hole 76. The hole 76 may be defined in the second end region 80 of the arm 74. The second end region 80 of the arm 74 overlaps part of the turbine housing 36, and thus the second end region 80 may be supported by the turbine housing 36. The first end region 78 is suspended in space, such that no housing supports the first end region 78.

Turning back to the shaft 62 of the wastegate assembly 14, the shaft 62 includes a first end 84 disposed inside the hole 76 of the arm 74 (see FIGS. 2 and 3). In other words, the first end 84 of the shaft 62 is surrounded by the inner surface 82 of the arm 74. The shaft 62 may also include a second end 86 (see FIG. 1) spaced from the first end 84, and the valve 64 is fixed to the second end 86. Therefore, the second end 86 of the shaft 62 is spaced from the hole 76 of the arm 74. In other words, the second end 86 of the shaft 62 is not disposed inside the hole 76. As such, part of the shaft 62 is contained inside the hole 76 of the arm 74 and another part of the shaft 62 is not contained inside the hole 76 of the arm 74.

As best shown in FIGS. 3 and 4, the shaft 62 further includes an outer surface 88 defining a groove 90 disposed inside the hole 76 of the arm 74. Therefore, the groove 90 is defined by a recessed surface of the outer surface 88. Generally, the groove 90 faces the inner surface 82 of the arm 74. As such, the inner surface 82 of the arm 74 surrounds the groove 90 of the shaft 62. In certain embodiments, the groove 90 is completely contained inside the hole 76 of the arm 74. Furthermore, in certain embodiments, the groove 90 is disposed circumferentially around the outer surface 88 of the shaft 62. As mentioned above, the shaft 62 is fixed to the arm 74. For example, the arm 74 and the first end 84 of the shaft 62 are welded together to form a joint 92 having a joint root region 94 disposed adjacent to the groove 90. As such, the joint root region 94 may be located at a distal region of the joint 92.

FIG. 2 also illustrates the joint 92 that joins the arm 74 and the shaft 62. Due to the first end region 78 being suspended in space, when one or more forces 96 (see arrows 96 in FIG. 2) are applied to the first end region 78, for example, in the direction of one of the arrows 96 of FIG. 2, stresses may be applied to the joint 92 between the arm 74 and the shaft 62 around the hole 76. For example, depending on the direction of the force 96 acting on the first end region 78 of the arm 74, the top of the joint 92 nearest the first end 84 may be in tension, and the bottom of the joint 92 nearest to the joint root region 94 may be in compression. It is to be appreciated that the arrows 96 in FIG. 2 are illustrative only and the forces 96 can be applied in other directions than illustrated to cause the stresses in the joint 92.

In certain embodiments, the joint root region 94 of the joint 92 forms an arcuate surface 98. Therefore, generally, the joint root region 94 has a radius. In other words, the joint root region 94 of the joint 92 does not have a sharp corner. If a sharp corner is formed at the joint root region 94, this could cause a stress riser at the most distal point of the joint root region 94 of the weld due to tension and/or compression occurring in the joint 92. To prevent the stress riser, the joint root region 94 of the joint 92 is formed with the arcuate surface 98 as discussed above. Therefore, the present design of the joint 92 and the groove 90 of the shaft 62 cooperate to reduce any stress riser due to tension and/or compression occurring in the joint 92.

Additionally, the joint 92 may have more than one radius. The joint 92 may include a first portion 100 which overlaps the arm 74 and a second portion 102 which overlaps the shaft 62. For example, as shown in FIG. 4, the radius of the first portion 100 of the joint 92 may be larger than the radius of the second portion 102. Said differently, the first portion 100 of the joint 92 may be a more gradual arcuate configuration than the second portion 102, and the second portion 102 of the joint 92 may be a steeper arcuate configuration than the first portion 100. In other embodiments, the radiuses of the first and second portions 100, 102 may be the same.

Furthermore, in certain embodiments, the groove 90 has an arcuate configuration. Therefore, generally, the groove 90 has a radius. More specifically, the recessed surface of the outer surface 88 has the arcuate configuration which may have the radius. The arcuate surface 98 of the joint root region 94 and the arcuate configuration of the groove 90 cooperate to reduce stress in the joint 92, and increase shaft 62 compliance. Said differently, the arcuate surface 98 of the joint 92 and the arcuate configuration of the groove 90 may be blended together, or have a smooth transition, to reduce stress in the joint 92, and increase shaft 62 compliance.

Referring to FIGS. 3 and 4, the outer surface 88 may have a first rim 104 and a second rim 106 spaced from each other. The first and second rims 104, 106 may define an outer boundary of the groove 90. More specifically, the first and second rims 104, 106 define the outer boundary of the recessed surface. The joint root region 94 or distal region of the joint 92 may be located nearest or proximal to the first rim 104.

In certain embodiments, the first and second rims 104, 106 are disposed circumferentially around the outer surface 88 of the shaft 62. As discussed above, the groove 90 may have the arcuate configuration, and the arcuate configuration may be between the first and second rims 104, 106. Furthermore, the joint 92 may directly contact the first rim 104, and the joint 92 may be spaced from the second rim 106. Additionally, the second rim 106 may be spaced from the arm 74. Therefore, the outer surface 88 of the shaft 62, spaced from the joint 92, does not directly contact the inner surface 82 of the arm 74.

FIG. 4 illustrates different suitable examples of the arcuate surface 98 of the joint 92 relative to the groove 90. In certain embodiments, the first rim 104 is disposed tangential to the arcuate surface 98 of the joint root region 94. The joint 92 in solid lines in FIG. 4 illustrates the first rim 104 disposed tangential to the joint root region 94. Additionally, the joint 92 in evenly spaced dashed lines in FIG. 4 illustrates the first rim 104 disposed tangential to the joint root region 94. In other embodiments, the first rim 104 is disposed non-tangential to the arcuate surface 98 of the joint root region 94. The joint 92 in dash-dot-dash lines in FIG. 4 illustrates the first rim 104 disposed non-tangential to the joint root region 94.

Figure 5:
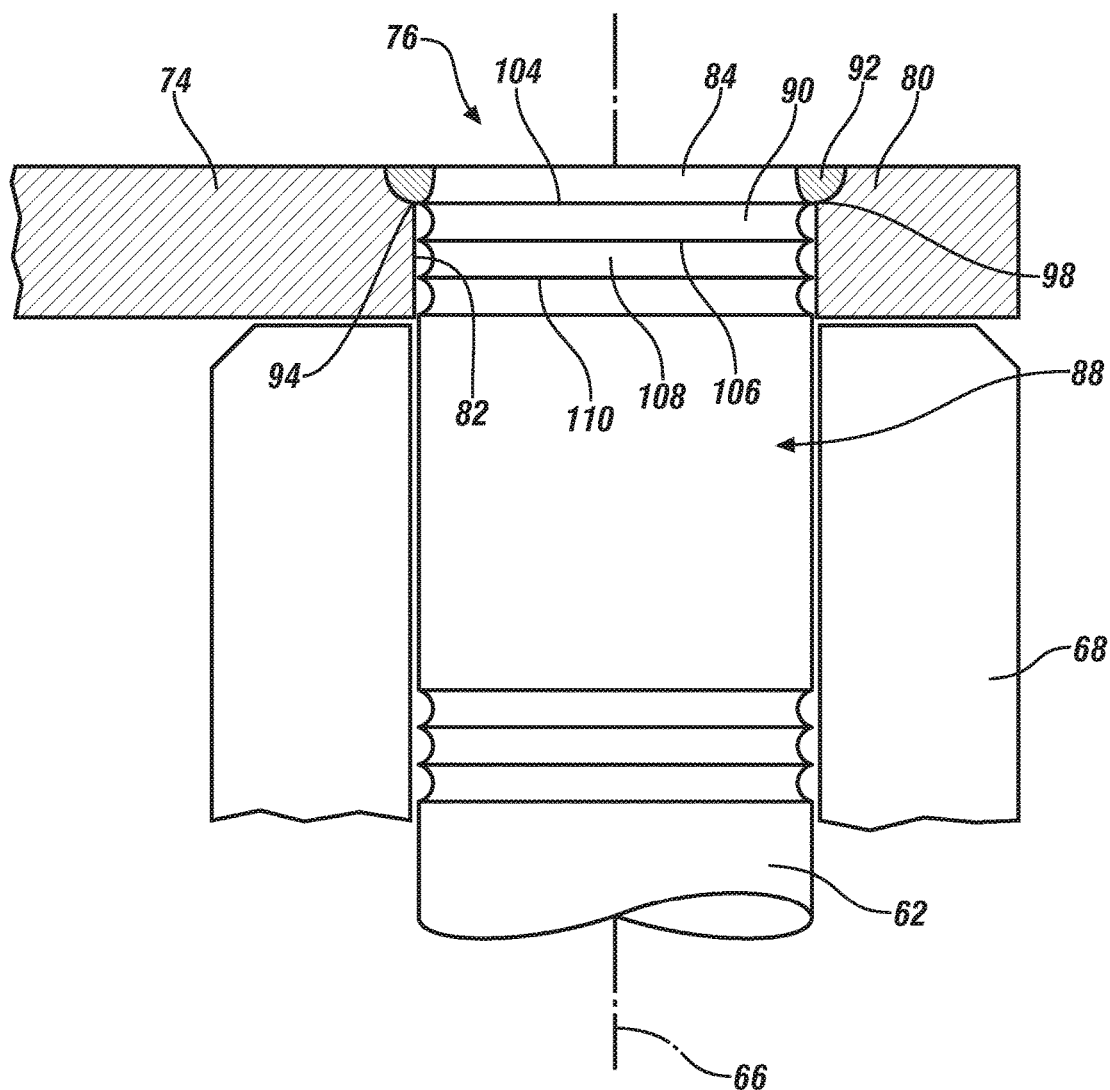
FIG. 5 is a schematic partial cross-sectional view of another configuration of a shaft of the wastegate assembly.

Referring to FIG. 5, the shaft 62 has a plurality of grooves 90, 108 (two of which are numbered in FIG. 5). Therefore, the groove 90 is further defined as a first groove 90, and the outer surface 88 of the shaft 62 may define a second groove 108 disposed farther from the first end 84 of the shaft 62 than the first groove 90. The joint 92 cooperates with the first groove 90, and the above discussion of the joint 92 relative to the groove 90 applies to the configuration of FIG. 5. Any suitable number of grooves 90, 108 may be utilized, and additionally, the grooves 90, 108 may be arranged in any orientation. For example, as shown in FIG. 5, two groups of grooves 90, 108 are illustrated spaced from each other. The grooves 90, 108 may be arranged next to each other to form convolutes (two groups of convolutes are illustrated in FIG. 5). The grooves 90, 108 reduce the overall loading on the joint 92, and the grooves 90, 108 increase the shaft 62 compliance to reduce a spring rate and respective reduction of resultant tensile force peak load in the shaft 62.

As also illustrated in FIG. 5, the joint 92 is spaced from the second groove 108. As discussed above, the outer surface 88 of the shaft 62 may have the first and second rims 104, 106, and the first and second rims 104, 106 may define the outer boundary of the first groove 90. Additionally, the outer surface 88 may have a third rim 110 spaced from the second rim 106. The second and third rims 106, 110 may define an outer boundary of the second groove 108. In certain embodiments, the joint 92 may directly contact the first rim 104 and the joint 92 may be spaced from the second and third rims 106, 110.

The present disclosure also teaches a method of joining parts of the wastegate assembly 14. Specifically, the method teaches joining of the arm 74 and the shaft 62 of the wastegate assembly 14.

The method includes positioning the first end 84 of the shaft 62 in the hole 76 of the arm 74. As discussed above, the outer surface 88 of the shaft 62 defines the groove 90 disposed inside the hole 76 of the arm 74. The method also includes positioning a laser welder 112 (schematically shown in FIG. 4) relative to the first end 84 of the shaft 62 and the arm 74. The method further includes welding the first end 84 of the shaft 62 and the arm 74 together with the laser welder 112 until the joint 92 forms the joint root region 94 having the arcuate surface 98 adjacent to the groove 90 in the shaft 62. The laser welder 112 may utilize a laser beam to produce a concentrated heat source which may provide the desired weld characteristics of the joint 92. For example, the laser welder 112 may form a large radius along the joint root region 94 relative to the groove 90 of the shaft 62.

Generally, the laser welder 112 is positioned at an angle 114 relative to the groove 90 to produce the joint 92 having the arcuate surface 98 at the joint root region 94. In certain embodiments, the laser welder 112 is positioned at an oblique angle 114 relative to the first rim 104. In other embodiments, the laser welder 112 is positioned at an obtuse angle 114 relative to the first rim 104. In yet other embodiments, the laser welder 112 is positioned perpendicular to the first rim 104.

In certain embodiments, welding the first end 84 is further defined as welding the first end 84 until the arcuate surface 98 and the first rim 104 defining part of the outer boundary of the groove 90 is disposed tangential to the arcuate surface 98 of the joint root region 94. In other embodiments, welding the first end 84 is further defined as welding the first end 84 until the arcuate surface 98 and the first rim 104 defining part of the outer boundary of the groove 90 is disposed non-tangential to the arcuate surface 98 of the joint root region 94.

It is to be appreciated that the order or sequence of performing the method is for illustrative purposes and other orders or sequences are within the scope of the present teachings. It is to also be appreciated that the method may include other features not specifically identified in the four paragraphs immediately above.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A wastegate assembly comprising:
an arm defining a hole;
a shaft including a first end disposed inside the hole of the arm;
wherein the shaft includes an outer surface defining a groove disposed inside the hole of the arm; and
wherein the arm and the first end of the shaft are welded together to form a joint having a joint root region disposed adjacent to the groove.

2. The assembly as set forth in claim 1 wherein the joint root region of the joint forms an arcuate surface.

3. The assembly as set forth in claim 2 wherein the groove has an arcuate configuration.

4. The assembly as set forth in claim 2 wherein the outer surface has a first rim and a second rim spaced from each other, and the first and second rims define an outer boundary of the groove.

5. The assembly as set forth in claim 4 wherein the joint directly contacts the first rim and the joint is spaced from the second rim.

6. The assembly as set forth in claim 5 wherein the first rim is disposed tangential to the arcuate surface of the joint root region.

7. The assembly as set forth in claim 5 wherein the first rim is disposed non-tangential to the arcuate surface of the joint root region.

8. The assembly as set forth in claim 4 wherein the groove has an arcuate configuration between the first and second rims.

9. The assembly as set forth in claim 4 wherein the second rim is spaced from the arm.

10. The assembly as set forth in claim 1 wherein the groove is further defined as a first groove, and the outer surface of the shaft defines a second groove disposed farther from the first end of the shaft than the first groove.

11. The assembly as set forth in claim 10 wherein the outer surface of the shaft has a first rim and a second rim spaced from each other, and the first and second rims define an outer boundary of the first groove, and wherein the outer surface has a third rim spaced from the second rim, and wherein the second and third rims define an outer boundary of the second groove.

12. The assembly as set forth in claim 11 wherein the joint directly contacts the first rim and the joint is spaced from the second and third rims.

13. The assembly as set forth in claim 1 wherein:
the joint root region of the joint forms an arcuate surface;
the outer surface has a first rim and a second rim spaced from each other, and the first and second rims define an outer boundary of the groove;
the groove has an arcuate configuration between the first and second rims;
the joint directly contacts the first rim and the joint is spaced from the second rim; and
the first rim is disposed tangential to the arcuate surface of the joint root region.

14. A turbocharger comprising:
a compressor;
a turbine;
a rotating assembly driven by exhaust gas and having a turbine wheel disposed inside the turbine and a compressor wheel disposed inside the compressor; and
a wastegate assembly defining an opening configured to selectively redirect at least a portion of the exhaust gas to bypass the turbine wheel, and wherein the wastegate assembly includes:
an arm defining a hole;
a shaft including a first end disposed inside the hole of the arm;
wherein the shaft includes an outer surface defining a groove disposed inside the hole of the arm; and
wherein the arm and the first end of the shaft are welded together to form a joint having a joint root region disposed adjacent to the groove.

15. The turbocharger as set forth in claim 14 wherein:
the joint root region of the joint forms an arcuate surface;
the outer surface has a first rim and a second rim spaced from each other, and the first and second rims define an outer boundary of the groove;
the groove has an arcuate configuration between the first and second rims;
the joint directly contacts the first rim and the joint is spaced from the second rim; and
the first rim is disposed tangential to the arcuate surface of the joint root region.

16. The turbocharger as set forth in claim 14 wherein:
the joint root region of the joint forms an arcuate surface;

the outer surface has a first rim and a second rim spaced from each other, and the first and second rims define an outer boundary of the groove;

the groove has an arcuate configuration between the first and second rims;

the joint directly contacts the first rim and the joint is spaced from the second rim; and the first rim is disposed non-tangential to the arcuate surface of the joint root region.

17. A method of joining parts of a wastegate assembly, the method comprising:

positioning a first end of a shaft inside a hole of an arm, with an outer surface of the shaft defining a groove disposed inside the hole of the arm;

positioning a laser welder relative to the first end of the shaft and the arm; and welding the first end of the shaft and the arm together with the laser welder until a joint forms a joint root region having an arcuate surface adjacent to the groove in the shaft.

18. The method as set forth in claim 17 wherein welding the first end is further defined as welding the first end until the arcuate surface and a first rim defining part of an outer boundary of the groove is disposed tangential to the arcuate surface of the joint root region.

19. The method as set forth in claim 17 wherein welding the first end is further defined as welding the first end until the arcuate surface and a first rim defining part of an outer boundary of the groove is disposed non-tangential to the arcuate surface of the joint root region.

* * * * *